United States Patent [19]
Cartwright

[11] 4,056,185
[45] Nov. 1, 1977

[54] CONVEYOR UNLOADER

[75] Inventor: William J. Cartwright, Palos Park, Ill.

[73] Assignee: The Continental Group, Inc., New York, N.Y.

[21] Appl. No.: 390,241

[22] Filed: Aug. 21, 1973

[51] Int. Cl.² ............................................. B65G 47/00
[52] U.S. Cl. .................................... 198/484; 198/598; 198/861
[58] Field of Search ................. 198/20 R, 22 R, 22 B, 198/25, 209, 210, 204, 205, 232, 29, 30, 482–484, 598, 612, 637, 651, 860, 861

[56] References Cited
U.S. PATENT DOCUMENTS

| 3,015,382 | 1/1962 | Kaufmann | 198/204 |
| 3,150,758 | 9/1964 | Johnson | 198/25 |
| 3,231,061 | 1/1966 | Borkmann | 198/22 |
| 3,339,698 | 9/1967 | Hartmeister et al. | 198/22 |
| 3,548,745 | 12/1970 | Sirvet et al. | 198/22 R |
| 3,568,851 | 3/1971 | Schafer | 198/210 |
| 3,780,847 | 12/1973 | Faessler et al. | 198/25 |

Primary Examiner—Evon C. Blunk
Assistant Examiner—Joseph E. Valenza
Attorney, Agent, or Firm—Diller, Brown, Ramik & Wight

[57] ABSTRACT

This disclosure relates to an apparatus which will unload tubular members, such as cans carried by travelling supports of an endless conveyor at a very high rate. The apparatus includes a plurality of carriers mounted for rotation about a fixed axis and being reciprocable parallel to the axis. The carrier defines a pocket and the pocket cooperates with an outer guide surface to retain the tubular members in position as the carriers rotate about the axis. The apparatus includes access doors which facilitate the inspection of the apparatus and the removal of jams and adjustments for all guide surfaces wherein tubular members of different diameters or lengths may be readily accommodated.

13 Claims, 19 Drawing Figures

CONVEYOR UNLOADER

This invention relates in general to new and useful improvements in transfer apparatus for tubular members, and more particularly to an unloader for unloading cans from travelling supports carried by endless conveyors of the type utilized in transporting cans through ovens.

Cans are transported through ovens generally on rodlike supports carried at spaced intervals by endless conveyor chains. These supports, in certain instances, can be in the form of brush-like members which have bristles which fit within the can so as to retain the can. While ovens may be made of any desired length so as to compensate for the speed of travel of the cans, the speed of travel of cans is restricted by the rate at which the cans may be unloaded from the conveyors. It is, therefore, the primary feature of this invention to provide an unloader which will unload cans from conveyor travelling supports at the rate of 600 cans per minute and higher.

Another feature of this invention is that in lieu of the cans being firmly gripped by carriers, the cans are loosely seated within the carriers and the carriers have associated therewith an outer guide arrangement so that the cans are floatingly disposed between the carriers and the outer guide arrangement as they pass about the unloader.

Another feature of the unloader is that substantially all of the area of the path of movement of cans within the unloader is accessible by means of doors. Further, these doors have mounted thereon elements of the outer guide arrangement whereby when a jam does occur, the jam may be readily removed.

Another feature of the unloader is that the major part of the outer guide arrangement is of a width substantially equal to the width of the path of movement of cans within the unloader, and thereby permits free ventilation permitting heat dissipation and at the same time the cans are visible to an operator so that the action of the unloader, including the undesired jamming of the cans, may be readily observed.

Another feature of this invention is the construction of the carriers of the unloader, each carrier having removably and selectively positioned thereon a plurality of shoes combining to define a pocket for a can, and there being associated with the shoes an adjustably positioned stripper which is adapted to engage the end of a can and remove the same from the travelling support of the conveyor from which the can is to be removed.

A further feature of the invention is the mounting of all of the essential guide surfaces of the unloader so that they may be readily adjusted to accommodate cans of different diameters and different lengths.

With the above and other objects in view that will hereinafter appear, the nature of the invention will be more clearly understood by reference to the following detailed description, the appended claims and the several views illustrated in the accompanying drawings:

Figure 4:
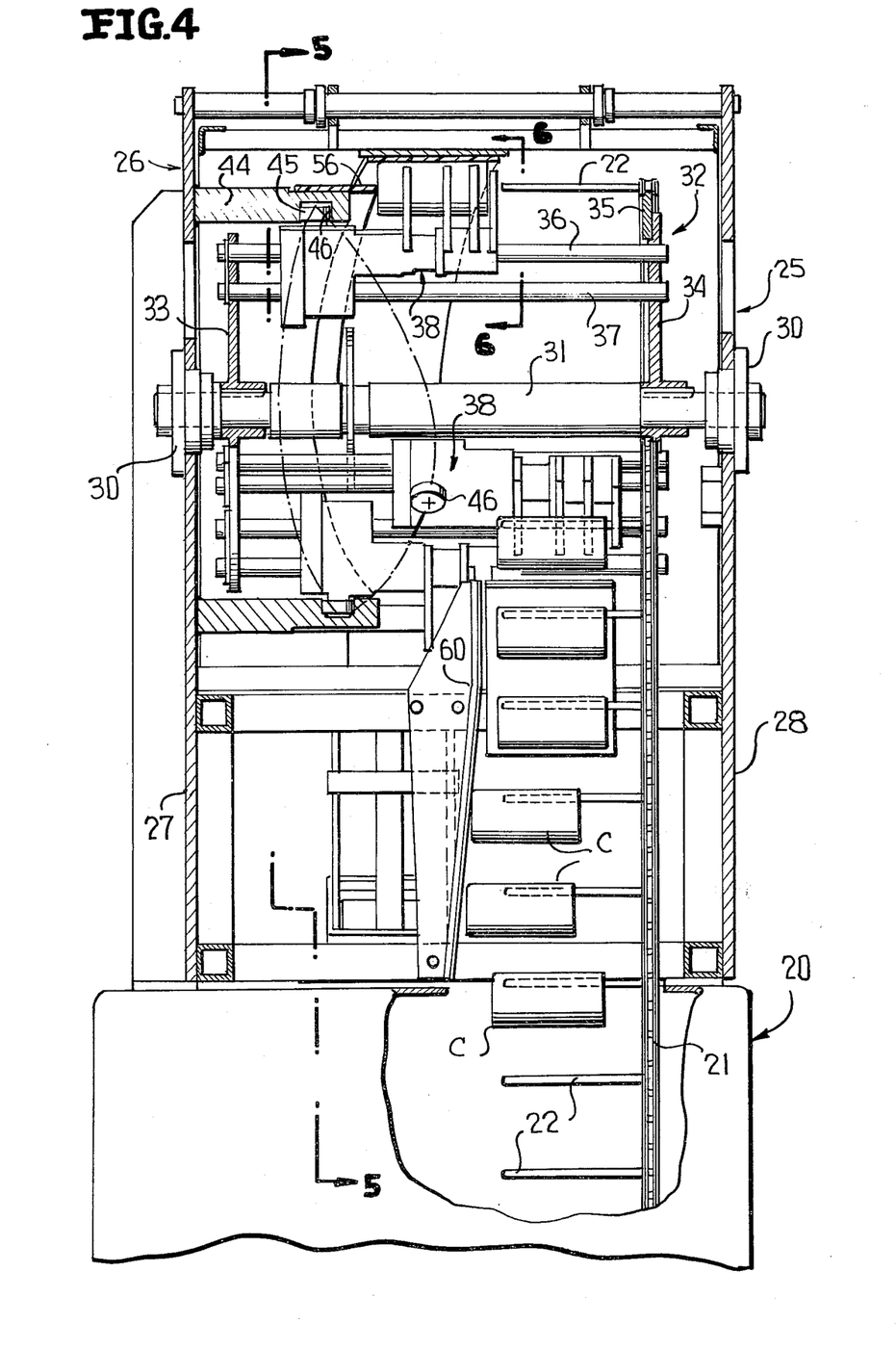
FIG. 4 is an enlarged vertical sectional view taken through the unloader generally along the line 4—4 of FIG. 1 and shows specifically the details of construction thereof.

Referring now to the drawings in detail, it will be seen that there is illustrated in FIG. 4 a conventional oven for cans, which oven is generally identified by the numeral 20 and which oven has running therethrough in a conventional manner an endless conveyor chain 21 having mounted thereon at spaced intervals, travelling supports 22. In the illustrated form of the invention, the travelling supports 22 are in the form of enlongated pins. However, they may be in the form of brushes having deflectable bristles which are received within a can and which serve to retain the can on the pin.

Figure 1:
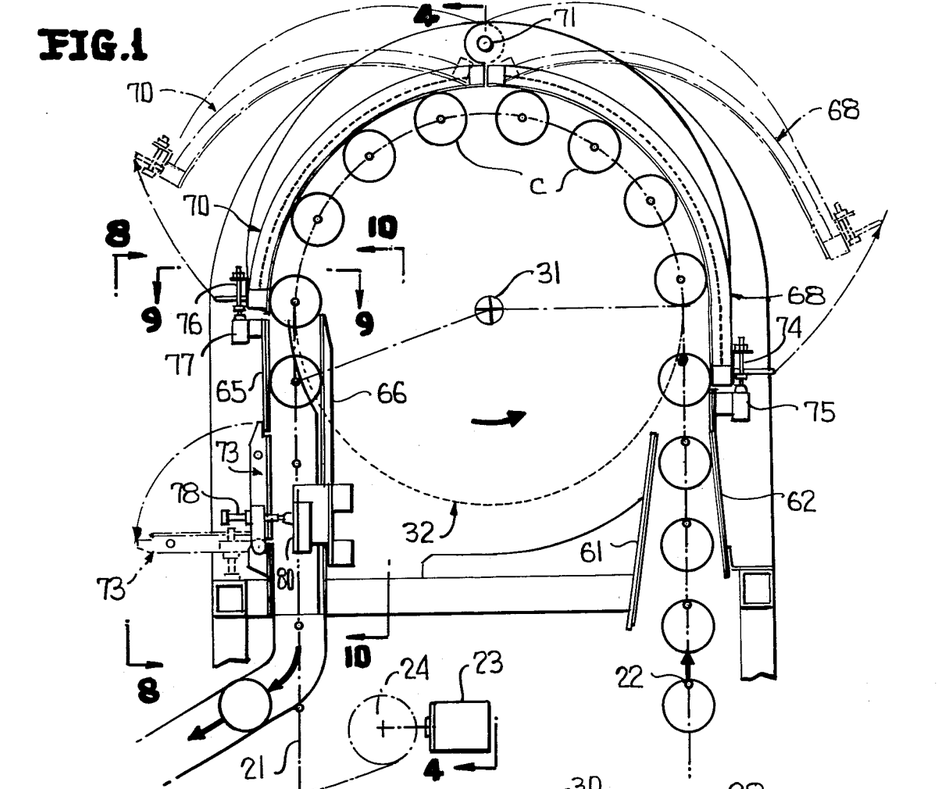
FIG. 1 is a schematic end view of the unloader and shows the relationship thereof to the conveyor carrying the cans to be unloaded.

It is also to be understood that the oven 20 includes a drive motor 23 which is schematically illustrated in FIG. 1 and which, through a sprocket 24, drives the conveyor chain 21.

Associated with the oven 20 is the unloader which is the subject of this invention, the unloader being generally identified by the numeral 25. The unloaoder 25 is preferably mounted on the oven 20 in the manner illustrated in FIG. 4, but may be positioned with respect to the oven and the conveyor chain 21 thereof in any desired manner.

The unloader 25 includes a suitable frame, generally identified by the numeral 26. The frame 26, among other features, includes a pair of end plates 27 and 28 which are provided with suitable bearing assemblies 30 disposed in transverse alignment. A shaft assembly 31 extends between and through these plates 27,28 and is rotatably journalled within the bearing assemblies 30.

The shaft assembly 31 is part of a turret, generally identified by the numeral 32 with the turret including an end plate 33 carried by the shaft assembly 31 for rotation therewith and being disposed adjacent the end plate 27. A further end plate 34 is carried by the shaft assembly 31 for rotation therewith and is positioned adjacent the end plate 28. The end plate 34 carries a sprocket ring 35 over which the endless conveyor chain 21 is engaged. In this manner, the endless conveyor chain 21 drives the turret 32 in unison therewith.

Figure 5:
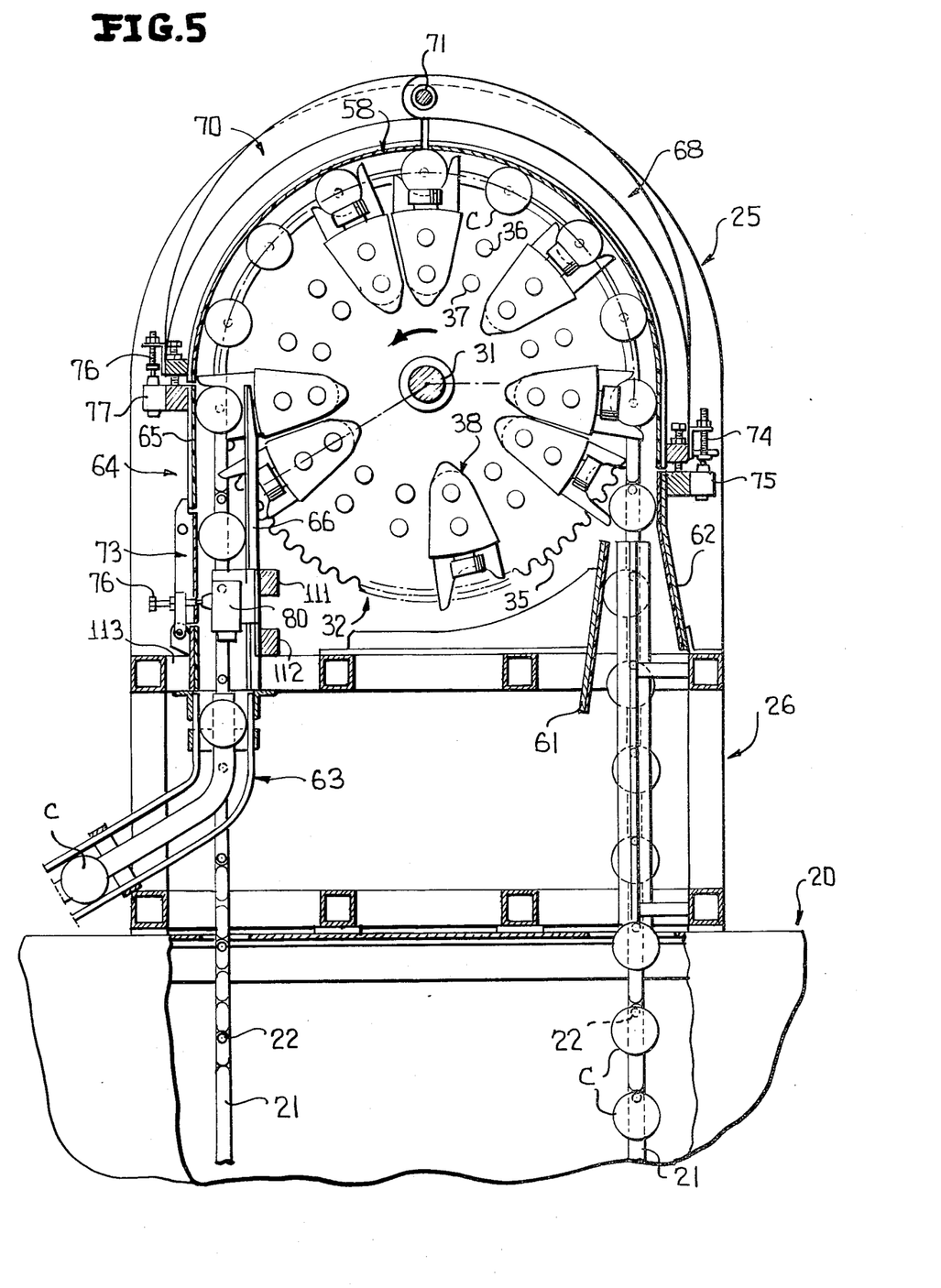
FIG. 5 is a transverse vertical sectional view taken along the line 5—5 of FIG. 4 and shows other specific details of the unloader.

Extending between the end plates 33,34 is a plurality of pairs of shafts 36,37, the shafts 36,37 of each pair being radially arranged, as is shown in FIG. 5, and having mounted thereon for rotary movement therewith and for reciprocable movement relative thereto a carrier, generally identified by the numeral 38. The carriers 38 are spaced in accordance with the spacing of the travelling supports 22 so that they will be automatically positioned to receive cans C therefrom. At this time it is particularly pointed out that the unloader 25 is most particularly adapted to remove cans C having bottoms, but it is not so limited in its function.

Figures 6, 7:
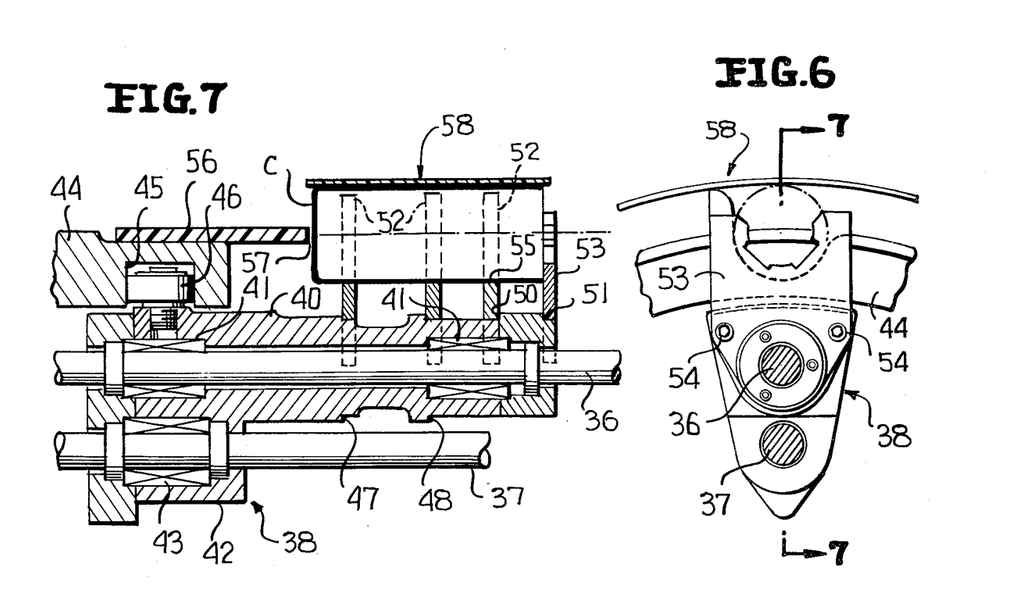
FIG. 6 is an enlarged fragmentary transverse sectional view taken along the line 6—6 of FIG. 4 with parts removed and shows the general details of one of the carriers.
FIG. 7 is a vertical sectional view taken along the line 7—7 of FIG. 6 and shows more specifically the constructional details of one of the carriers and the mounting thereof.

Referring now to FIGS. 5 and 6, it will be seen that each carrier 38 includes an elongated body portion 40 in which an associated shaft 36 is received with the body portion 40 being provided adjacent the opposite ends thereof with bearings 41 mounting the body portion 40 for reciprocation relative to the shaft 36. The carrier 38 also includes an offset body portion 42 through which the shaft 37 extends with the body portion 42 having mounted therein a suitable bearing 43 for facilitating the sliding movement of the body portion 42 along the shaft 37. It will be seen that the cooperation of the carrier 38 with the shafts 36,37 is one wherein the carrier 38 is radially fixed with respect to the remainder of the turret 32 and is mounted for reciprocation in a straight line disposed parallel to the axis of rotation of the turret 32.

At this time it is pointed out that there is suitably secured to the end plate 27, as shown in FIG. 4, a tubular member 44. The tubular member 44 projects inwardly from the end plate 27 in telescoping relation with respect to the left end of the turret 32 and is in the form of a cam. The cam 44 has formed in the interior thereof a cam track 45 which receives cam followers 46 of the carriers 38. Referring once again to FIG. 7, it will be seen that each cam follower 46 is suitably carried by the body portion 40 of the respective carrier 38. Thus, as the turret 32 rotates, due to the configuration of the cam track 45, the carriers 38 are reciprocated at a controlled rate along the shafts 36,37.

It is to be noted that the body portion 40 of each carrier 38 is configured to define a plurality of shoulders 47,48,50 and 51. These shoulders are provided with suitable threaded bores for the reception of fasteners (not shown) to effect the releaseable and interchangeable securement of shoes 52 to the shoulders 47,48,50 and a stripper member 53 to either the shoulder 50 of the shoulder 51. It is to be noted that the body portion 40 is generally triangular in cross section, as shown in FIG. 7, so as to facilitate the space for the threaded bores and that typical fasteners 54 securing the stripper member 53 in place are illustrated.

It is to be noted that the shoes 52 are preferably formed of a soft, yet rigid, plastic material which when engaged by a decorated can, will not scratch or otherwise damage the finish on the can. It is further to be noted that the shoes 52 are configured to define a pocket for a can C into which the can is loosely received.

With continued reference to FIG. 7, it will be seen that when a can C is seated within a pocket 55 of a carrier 38, it is urged to the left by the stripper member 53. Movement thereof to the left is limited by a a rigid soft plastic axial guide member 56 which is suitably secured to the exterior surface of the cam 44 and which has an edge 57 which is shaped in accordance with the predetermined path of movement of the carriers 38 so as to be always spaced relative to a stripper member 53 a distance slightly in excess of the length of the can which is to be handled. In this manner, accidental movement of the can C to the left is prevented.

There is also provided a radially outer guide, generally identified by the numeral 58. This guide is spaced from the carrier 38 a distance wherein there is suitable clearance between the pocket 55 so that a can C may be loosely seated within the pockets 55 and may be thrown radially outwardly by centrifical force so as to generally roll along the guide 58. In this way there is no wedging of the cans between the carriers 38 and the guide 58. The guide 58 is preferably formed of polished stainless steel so as to prevent marring of the cans coming into contact therewith.

Referring now to FIG. 4, it will be seen that the frame 26 has suitably mounted therein a fixed cam 60. The cam 60 is positioned in axially opposed relation to the path of travelling supports 22 entering into the unloader 25 and serve to engage the ends of the cans C which are not properly positioned on the travelling supports 22 and to move the cans to the right for alignment with the carriers 38. It is to be understood that the cam 60 will assure the positioning of the cans C between the stripper members 53 and the guide 56.

In order to assure the proper centering of cans at the time they are engaged by the carriers 38, as was best shown in FIG. 5, the unloader 25 is provided with a pair of converging guides 61 and 62. These guides 61,62 are suitably carried by the frame 26 and have the cans engaging faces thereof formed of or provided with polished stainless steel covering so as to prevent marring of the cans. The cam 60 is similarly constructed.

Figure 2:
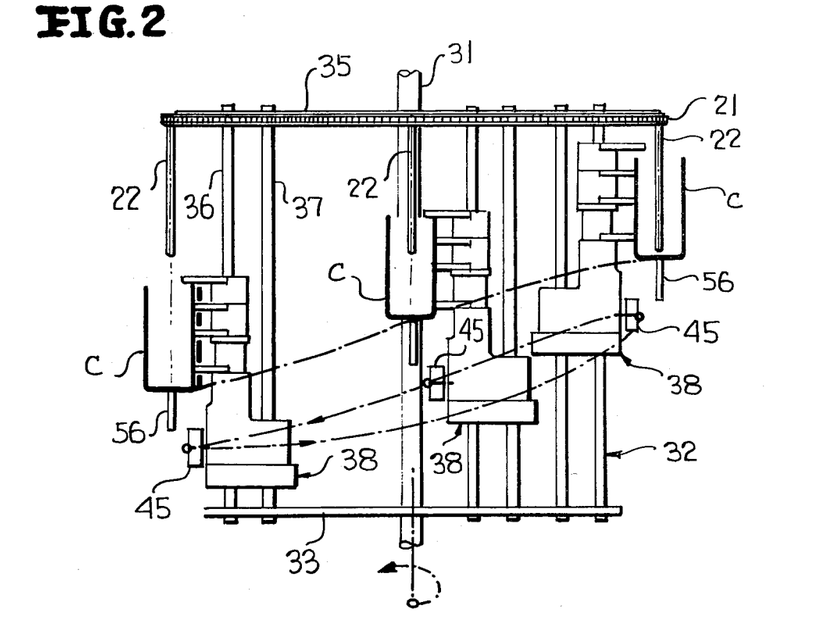
FIG. 2 is a schematic plan view showing generally the movement of the carriers in the unloading of cans.
Figure 10:
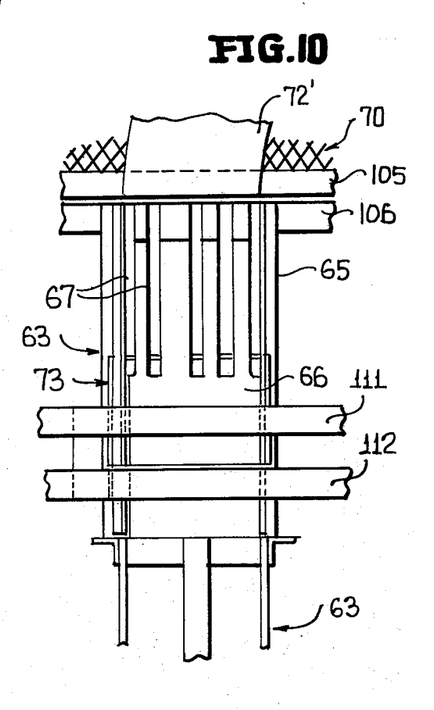
FIG. 10 is a fragmentary vertical sectional view, with parts removed, taken along the line 10—10 of FIG. 1.

It will be readily apparent from FIGS. 2 and 4 that once a can is engaged with a carrier 38, it is retained within the pocket 55 thereof by the cooperation of the outer guide 58 and is shifted axially of the turret 32 with the carrier 38 so as to completely displace the can from the travelling support 22 previously carrying the same. This is accomplished well within 180° of rotation of the respective carrier 38. AT this time, the can is ready to be discharged from the respective carrier 38 and directed into a take-away chute, generally identified by the numeral 63 (FIG. 5). Thus, remote from the guides 61 and 62, the unloader 25 is provided with a discharge unit, generally identified by the numeral 64. The discharge unit 64 is suitably carried by the frame 26 and includes an outer guide which has associated therewith a plate 66 which, as is best shown in FIG. 10, has a plurality of slotted openings 67 therein for the passage of the shoes 52 and the stripper member 53. The plate 66 may be considered to be a stripper plate although actually no stripping operation occurs in that the cans have a tendency to continue their downward travel while the carriers 38 continue their circular travels. However, the plate 66 does prevent any possibility of the cans travelling with the carriers 38 and assures the downward movement of the cans towards the take-away chute 63.

Figure 3:
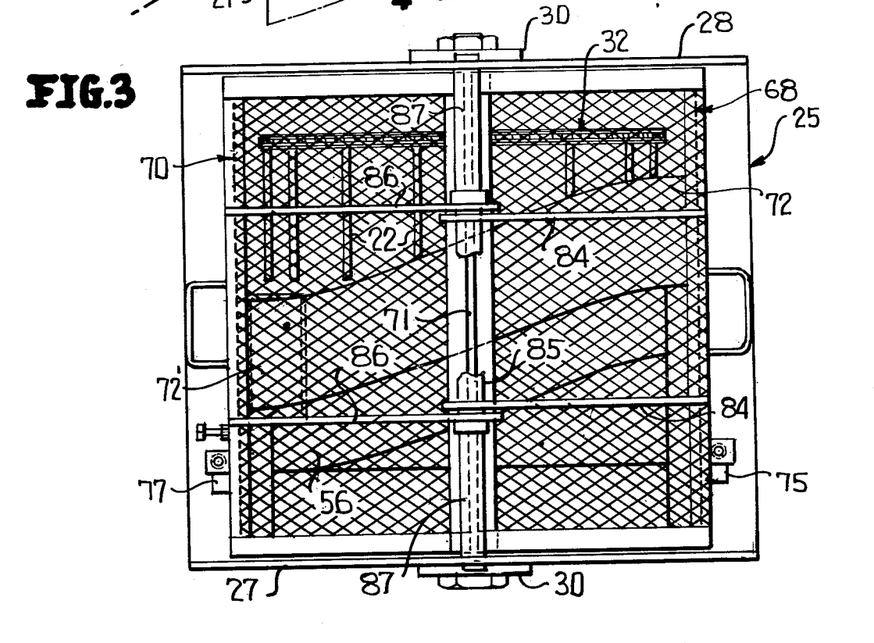
FIG. 3 is a plan view of the unloader and shows more specifically the details thereof.

Referring now to FIGS. 3 and 5, it will be seen that the upper portion of the unloader 25 includes two large doors 68 and 70 which are mounted for upwardly swinging movement on a common door support 71. The outer guide 58 is formed of two portions 72 and 72' which are carried by the doors 68 and 70, respectively. Further, these doors 68,70 are preferably of the type wherein the operation of the unloader 25 therethrough is visible. Thus, by forming the elements 72 and 72' of the guide 58 of axial dimension only slightly greater than the maximum length can to be unloaded by the unloader 25, substantially all of the operation of the unloader 25 is readily visible to the operator thereof.

While it is intended that the unloader 25 operates in a continuous manner, it will be readily apparent that with any type of machinery there is a possibility that a jam will occur. If the jam occurs within that portion of the unloader 25 enclosed by the doors 68,70, the jam may be readily cleared by merely swinging the proper door upwardly and thereafter manually removing the jammed can or cans.

It is also to be noted that the discharge guide assembly 64 is provided with a door 73. The door 73 is also swingable to an open position so as to effect the release of cans which may jam within the discharge guide assembly.

It is obvious that it is not desired that the turret 32 continue to rotate at such time as one of the doors 68,70 and 73 be opened. Accordingly, suitable switch means are provided for immediately stopping the operation of the drive motor 23. With reference to FIG. 1, it will be seen that associated with the door 68 is an adjustably mounted actuator 74 which is operable to retain in a closed position a fixedly mounted switch 75 when the door 68 is closed. In a like manner, the door 70 is provided with an adjustably mounted actuator 76 which engages and closes a fixedly mounted switch 77 as long as the door 70 is closed. Finally, the door 73 has associated therewith an adjustably mounted switch actuator 78 which engages and holds in a closed position a fixedly mounted switch 80 when the door 73 is closed. Thus, the opening of any one of the doors 68,70 or 73 would result in the breaking of the circuit to the motor 23 and the immediate stopping of both the conveyor chain 21 through the oven and the rotation of the turret 32.

From the foregoing, it will be readily apparent that when the oven 20 is operating and the conveyor chain 21 thereof is moving, cans C carried by the travelling supports 22 will be automatically moved into alignment with the carriers 38 of the unloader 25. After each can is loosely seated within the pocket 55 of the associated carrier 38, continued rotation of the turret 32 will result in the carrier 38, due to the action of the cam track 45 and the cam follower 46, to move to the left with the stripper member 53 assuring the movement of the can off of its associated travelling support 22. After the can has been completely removed from its travelling support 22, it will be discharged by the action of the discharge guide assembly 64 from its associated carrier 38 and will then fall by gravity down into the take-away chute 63.

Figure 17A:
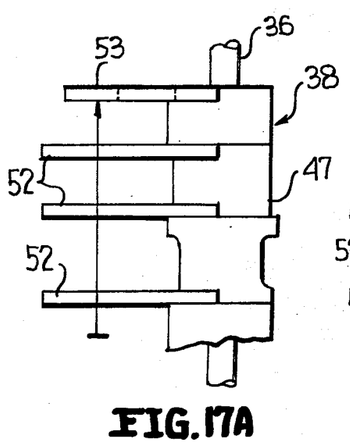
FIGS. 17A, 17B and 17C show the manner in which shoes and a stripper member may be mounted on a carrier body for accommodating cans of different lengths.
Figure 17B:
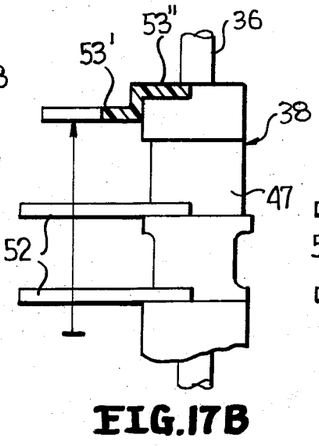
Figure 17C:
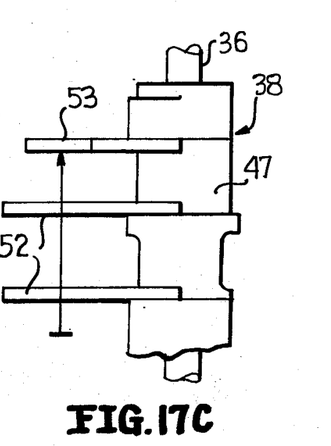

It is to be understood that the unloader 25 is adaptable to a range of can diameters and lengths. Reference will now be made to FIGS. 17A, 17B and 17C as to the manner in which a carrier 38 may be readily adapted to different can lengths and still assure the accurate positioning of the cans in an axial direction. It is first of all to be understood that the guide 56 limits the movement of the cans to the left in their passage through the unloader 25 with the turret 32. Further, the cam 60 controls the axial position of the cans as far as their left hand position is concerned.

Referring now to FIG. 17A, it will be seen that the carrier 38 has the body portion 47 thereof provided with three shoes 52 and the stripper member 53 in the manner shown in FIG. 7. The carrier 38 is thus adapted to receive a can of maximum length. Reference is now made to FIG. 17C wherein the carrier 38 has been converted to receive a can of minimum length. It is to be noted that the shoe 52 positioned adjacent the stripper member 53 in FIG. 17A has been removed. Further, the stripper member 53 has been shifted to the position of the removed shoe 52.

Referring now to FIG. 17B, it will be seen that the carrier 38 is adapted to receive a can of intermediate length. Once again that shoe 52 positioned adjacent the stripper member 53 in FIG. 17A has been removed. However, its position has not been taken by the stripper member 53. Instead, an entirely new stripper member 53' has been provided with the stripper member 53' having an offset mounting portion 53'' which is mounted on the body portion 47 of the carrier 38 in the same position as the member 53 in FIG. 17A. It is to be noted that the stripper member 53' assumes a position intermediate the positions of the stripper member 53 in FIGS. 17A and 17C.

It is also to be understood that the shoes 52 are replaceable by like shoes, but having can receiving notches therein of different dimensions to receive cans of different diameters.

It is to be understood that when the length of can body received by the unloader 25 is varied, it is only necessary to adjust the width of the discharge guide assembly 64 in a manner to be described hereinafter and to provide a proper take-away chute 63. On the other hand, when the diameter of the can body to be handled by the unloader 25 is varied, numerous adjustments are required. In order to facilitate these adjustments, there is provided a spacer member, generally identified by the numeral 81 and illustrated in FIGS. 14 and 15. The spacer member 81 includes end portions 82 of a diameter corresponding to the diameter of the can which is to be removed. These end portions 82 are readily receivable within the seat 55 defined by the notches in the shoes 52.

Figures 14, 15, 16:
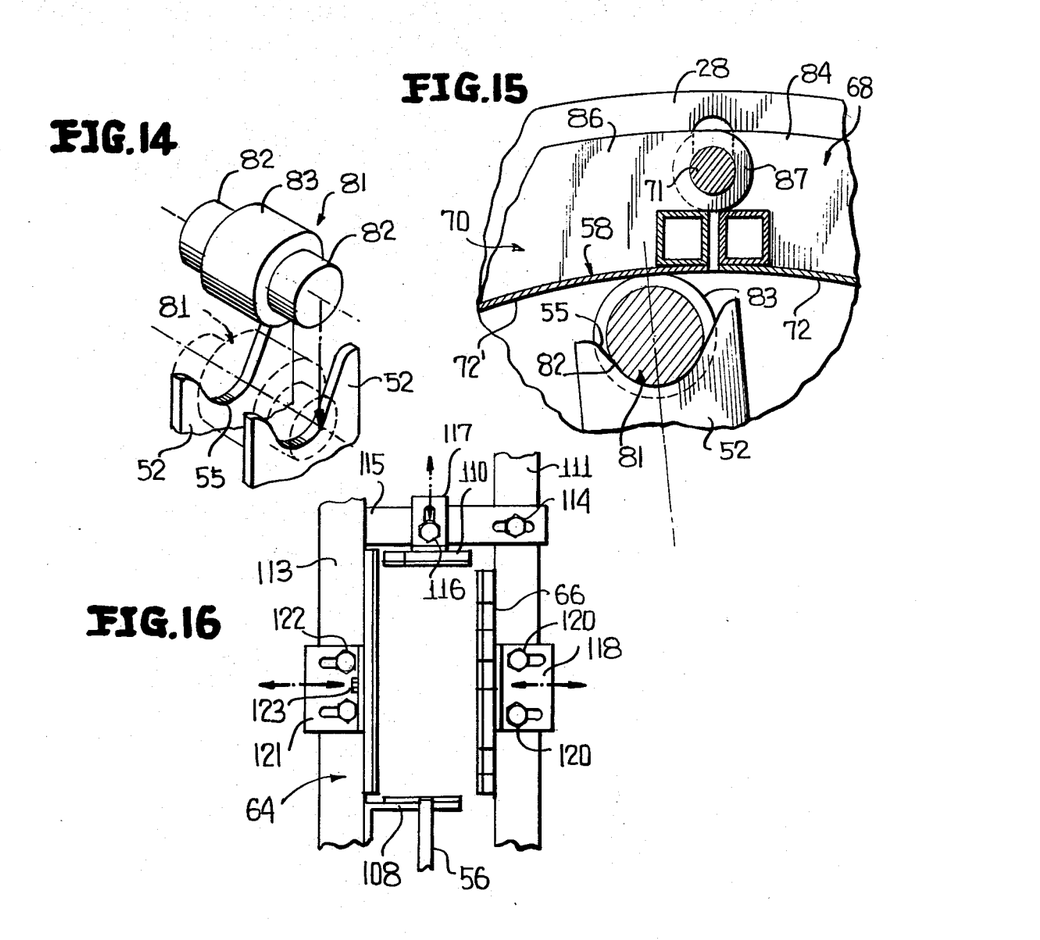
FIG. 14 is a perspective view showing the spacer member and the relationship thereof with respect to two of the shoes of a carrier.
FIG. 15 is an enlarged fragmentary sectional view with parts broken away showing the manner in which the spacer member is utilized in adjustably mounting the upper door support.
FIG. 16 is a schematic plan view in the area of the can discharge of the unloader and shows the adjustable mounting of the various components thereof.

It is also to be noted that the spacer member 81 has a central portion 83 of a larger diameter than the end portions 82. The enlarged central portion 83 is of an axial extent to fit between a pair of adjacent ones of the shoes 52. The purpose of the enlarged diameter central portion 83 is to assure that there is proper clearance between the pockets 55 and the outer guide 58 so that cans carried by the carriers 38 may freely float between the pockets 55 and the outer guide 58 and no wedging or scuffing will occur during the normal operation of the unloader 25.

When the diameter of the can to be unloaded is changed, it is first of all necessary to adjust the clearance between the outer guide 58 and the path of the pockets 55. This is accomplished by vertically adjusting the pivot shaft 71. With reference to FIG. 3, it is to be noted that the door 68 is mounted on the pivot shaft 71 primarily by means of a pair of arms 84 which are rigidly secured to the frame of the door 68 and which are, in turn, connected to an elongated sleeve member 85 journalled on the shaft 71. In a like manner, the door 70 includes a pair of spaced arms 86 which are rigidly secured to the frame of the door 70 and which are disposed axially outwardly of the arms 84. Each arm 86 carries a sleeve member 87 which is journalled on the pivot shaft 71.

Figures 11, 12, 13:
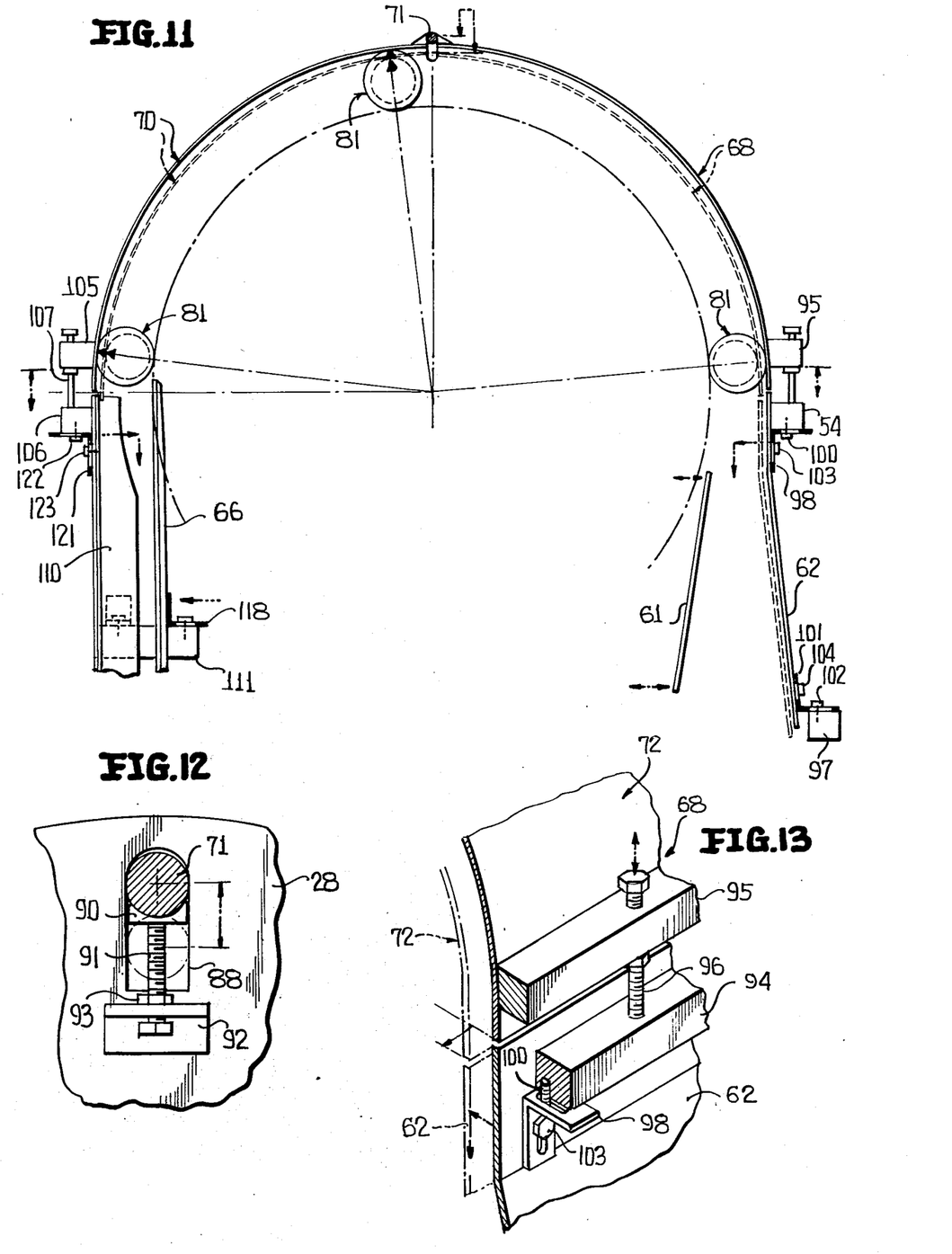
FIG. 11 is a schematic view showing the manner in which the various guides are adjustably mounted and the manner in which a spacer member is utilized in adjustably mounting the doors of the unloader.
FIG. 12 is an enlarged fragmentary view showing the manner in which the support for the upper doors is vertically adjustably mounted.
FIG. 13 is a fragmentary perspective view showing generally the adjustment of the lower edge of one of the upper doors and the associate guide plate.

The pivot shaft 71 is mounted for vertical adjustment within the end plates 27,28 of the frame 26 by providing the end plates with vertical slots 88, as is shown in FIG. 12, with respect to end plate 28. The pivot shaft 71 is supported by a shoe 90 which is vertically adjustable within the slot 88 by means of an adjusting screw 91. The adjusting screw 91 is threadedly engaged in a bracket 92 carried by the end plate 28 and is locked in an adjusted position by means of a nut 93. It is to be understood that this arrangement is only a typical arrangement and could be modified within the scope and spirit of the invention.

Referring now to FIG. 15, it will be seen that when the doors 68,70 are to be adjusted, the spacer member 81 is placed within one of the carriers 38 and is run to a generally top position and thereafter, the pivot shaft 71 is adjusted downwardly so that there is a light contact between one of the guide elements 72,72′, and the enlarged central portion 83 of the spacer member 81. This provides for the proper positioning of the pivot shaft 71.

Having adjusted the position of the pivot shaft 71, it is necessary to adjust lower edges of doors 68,70. Accordingly, reference is made to FIGS. 11 and 13. The frame 26 includes a horizontal frame member 94 and the door 68 includes a horizontal frame member 95. The horizontal frame member 95 is provided with adjustable stop members 96 which are threadedly associated with the horizontal frame member 95 and which are engageable with the frame member 94.

If the pivot shaft 71 is adjusted upwardly, then the lower edge of the door 68 will swing inwardly towards the path of the carriers 38 and have a wedging effect. It is, therefore, necessary to adjust the lower edge of the door 68 upwardly with the result that it will also swing outwardly to provide the necessary clearance. The lower edges of the doors 68 may be adjusted by means of one of the spacer members 81 positioned within a carrier 38 and assuming a position adjacent the lower edge of the door 68 as shown at the right side of FIG. 11.

The adjusting of the lower edge of the door 68 also requires adjusting of the guide 62. The guide 62 is carried by and extends generally between the frame member 94 and a further frame member 97 of the frame 26. The guide 62 is carried by sets of angle brackets 98 radially adjustably secured to the frame member 94 by fasteners 100 and sets of angle brackets radially adjustably carried by the frame member 97 by means of fasteners 102. The guide 62 is vertically adjustably secured to the angle brackets 98 by fasteners 103 and to the angle brackets 101 by fasteners 104 which pass through slots to provide for the necessary adjustments. The guide 61 is also mounted for generally radial adjustment as indicated by the arrows.

It is to be noted that the upper portion of the guide 62 must be aligned with and form generally a continuation of the lower portion of the guide element 72 carried by the door 68. Thus, as the lower edge of the guide element 72 is adjusted inwardly or outwardly and upwardly or downwardly, the upper portion of the guide 62 is adjusted in a like manner. The lower portion of the guide 62 is adjusted in a like manner.

Referring once again to FIG. 11, it will be seen that the lower edge of the door 70 is provided with a longitudinal frame member 105 which is associated with a frame member 106 of the frame 26. Further, the frame member 105 carries adjustable stops 107, which correspond to the stops 96. Thus, the lower edge of the door 70 may be adjusted in the same manner as described with respect to the door 68 to provide for the necessary clearance between the guide element 72′ carried by the door 70 and the carriers 38.

It is to be understood that the discharge guide assembly 64 must be adjusted both for variations in can lengths and can diameter. Previously, the discharge guide assembly 64 has been described as including a guide plate 65 and the stripper plate 66. Additionally, the guide assembly 64 includes a fixed guide member 108 which is associated with and is a continuation of the guide 56 for engaging the normally closed end of the can. Opposing the guide 108 is a guide 110 which must be adjusted in accordance with variations in length of the cans being unloaded. At this time it is pointed out that all of the can engaging faces of the guides 65, 66, 108 and 110, as well as that of the door 73, are formed of or provided with a polished stainless steel covering so as to prevent damage to the cans.

The frame 26 includes further longitudinal frame members 111, 112 and 113 (FIG. 5). Extending outwardly from the frame members 111, 112 and secured thereto for outwardly adjustable positioning by means of fasteners 114, are support brackets 115. The support brackets 115 have, in turn, adjustably secured thereto by means of fasteners 116, angle brackets 117 for axial sliding movement. The angle brackets 117, in turn, support the guide 110. Thus the guide 110 may be accurately positioned for can bodies of various dimensions.

The stripper plate 66 is also adjustably mounted in accordance with the diameter of the cans which are being unloaded. The stripper plate is mounted for adjustable positioning by means of angle brackets 118 which are adjustably secured to the respective frame members 111, 112 by means of suitable fasteners 120.

Finally, the guide 65 is mounted for both vertical adjustable positioning and inwardly-outwardly adjustable positioning by means of angle brackets 121 which are adjustably secured to the frame members 106, 113 by means of fasteners 122 to provide the inwardly-outwardly adjustment. In turn, the angle brackets 121 have a vertical slot and fastener arrangement including a fasteners 123 which permits vertical adjustment of the guide 65. It is to be understood that the guide 65 must be vertically and inwardly-outwardly adjusted so as to form a continuation of the lower surface of the guide element 72′ in the manner described with respect to the guide element 72 and the guide 62.

Figure 8:
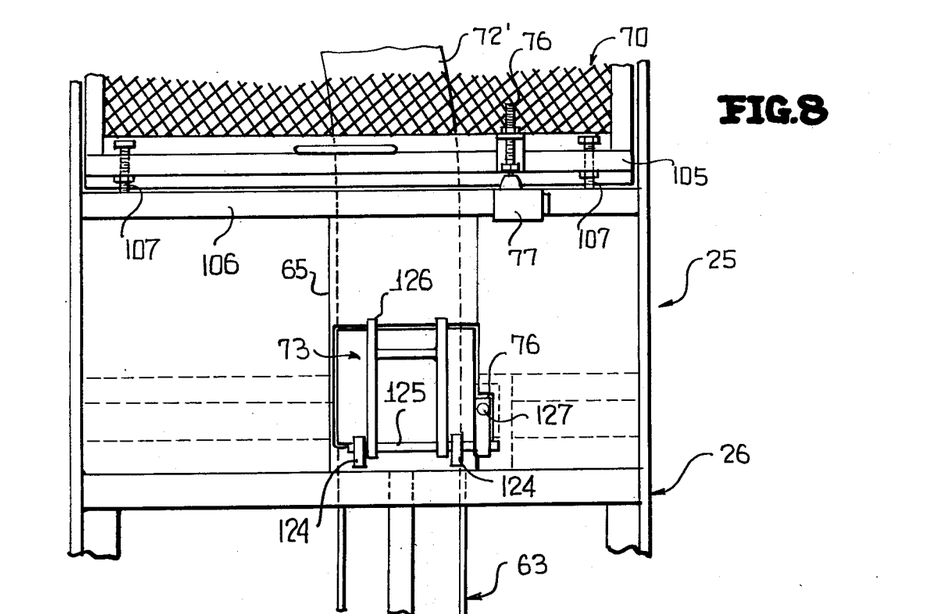
FIG. 8 is a fragmentary side elevational view taken along the line 8—8 of FIG. 1.
Figure 9:
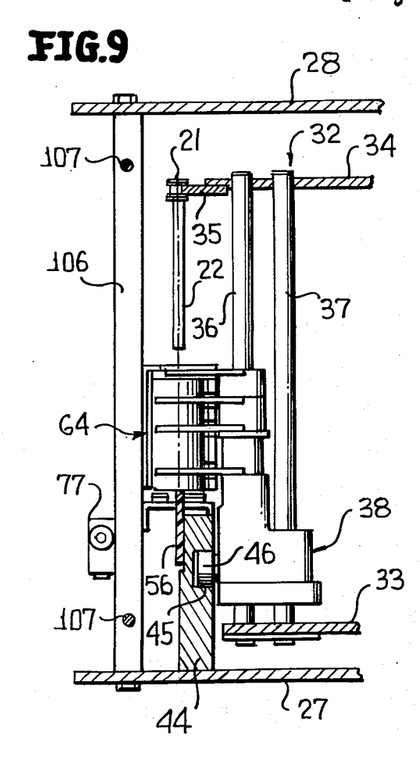
FIG. 9 is a fragmentary horizontal sectional view with parts removed taken generally along the line 9—9 of FIG. 1.

At this time it is pointed out that the door 73 is carried by the guide 65 for adjustment therewith. As is shown in FIG. 8, the guide 65 is provided with suitable brackets 124 which carry a hinge pin 125 and the door 73 includes a suitable frame structure 126 which is pivotally mounted on the hinge pin 125. It is also to be noted that the switch actuator 76 is carried by an arm 27 which is secured to the pivot shaft 125 for pivoting together with the frame 126 and the door 73.

From the foregoing, it will be readily apparent that not only is the unloader of a construction wherein it may handle large volumes of cans in a short time, that is on the order of 600 cans per minute and above, in a relatively jam proof manner, but also that when jams do occur, they may be readily cleared. Further, the unloader may be readily adjusted so as to adapt the same to a range of can diameters and lengths.

Although only a preferred embodiment of the invention has been specifically illustrated and described herein, it is to be understood that minor variations may be made in the unloader construction, particularly in the adjustment of the guides thereof, which adjustments have only been schematically illustrated, without departing from the spirit and scope of the invention, as defined by the appended claims.

I claim:

1. An apparatus for unloading cans and like tubular members from travelling supports carried by an endless conveyor, said apparatus comprising a turret mounted for rotation about an axis, a plurality of carriers having means defining pockets, means mounting said carriers in uniformly circumferentially spaced relation about said axis for rotation in unison about said axis and independent reciprocation parallel to said axis, the spacing of said carriers corresponding to the spacing of travelling supports from which cans and like tubular members are to be unloaded, means for rotating said turret with said carriers moving at the same rate as the supports, said carriers defining radially outwardly opening pockets, outer guide means disposed generally radially outwardly of said carriers and cooperable with said carriers to retain cans and like tubular members within said pockets, and each carrier including a stripper member for engaging a can or like tubular member at one end thereof to move the same axially with said carrier, said turret being encased within an enclosure including swingably mounted doors, said outer guide means being at least in part carried by said doors, and door support means for adjustably positioning said doors relative to said axis to selectively vary the spacing between said outer guide means and said carrier pockets for receiving cans and like tubular members of selected different diameters.

2. The apparatus of claim 1 wherein said door support means include a door main support, means mounting said main door support for adjustable selected radial positioning, means mounting two of said doors on said main door support in oppositely disposed relation, and adjustable stop means at edges of said doors remote from said main door support for radially positioning said remote door edges in accordance with the adjusted position of said main door support.

3. An apparatus for unloading cans and like tubular members from travelling supports carried by an endless conveyor, said apparatus comprising a turret mounted for rotation about an axis, a plurality of carriers having means defining pockets, means mounting said carriers in uniformly circumferentially spaced relation about said axis for rotation in unison about said axis and independent reciprocation parallel to said axis, the spacing of said carriers corresponding to the spacing of travelling supports from which cans and like tubular members are to be unloaded, means for rotating said turret with said carriers moving at the same rate as the supports, said carriers defining radially outwardly opening pockets, outer guide means disposed generally radially outwardly of said carriers and cooperable with said carriers to retain cans and like tubular members within said pockets, and each carrier including a stripper member for engaging a can or like tubular member at one end thereof to move the same axially with said carrier, said turret being encased within an enclosure including swingably mounted doors, said outer guide means being at least in part carried by said doors, and said outer guide means being arranged in a pattern in accordance with the path of movement of said carriers adjacent the same and of a limited axial extent permitting receiving of tubular members carried by said carriers, said doors except for said outer guide means being substantially of a seethrough construction to permit viewing of the operation of said apparatus.

4. An apparatus for unloading cans and like tubular members from travelling supports carried by an endless conveyor, said apparatus comprising a turret mounted for rotation about an axis, a plurality of carriers having means defining pockets, means mounting said carriers in uniformly circumferentially spaced relation about said axis for rotation in unison about said axis and independent reciprocation parallel to said axis, the spacing of said carriers corresponding to the spacing of travelling supports from which cans and like tubular members are to be unloaded, means for rotating said turret with said carriers moving at the same rate as the supports, said carriers defining radially outwardly opening pockets, outer guide means disposed generally radially outwardly of said carriers and cooperable with said carriers to retain cans and like tubular members within said pockets, and each carrier including a stripper member for engaging a can or like tubular member at one end thereof to move the same axially with said carrier, said turret being encased within an enclosure including swingably mounted doors, said outer guide means being at least in part carried by said doors, and a drive unit, and there being associated with each door control means for said drive unit operable to deenergize said drive unit in response to opening movement of said doors.

5. An apparatus for unloading cans and like tubular members from travelling supports carried by an endless conveyor, said apparatus comprising a turret mounted for rotation about an axis, a plurality of carriers having means defining pockets, means mounting said carriers in uniformly circumferentially spaced relation about said axis for rotation in unison about said axis and independent reciprocation parallel to said axis, the spacing of said carriers corresponding to the spacing of travelling supports from which cans and like tubular members are to be unloaded, means for rotating said turret with said carriers moving at the same rate as the supports, said carriers defining radially outwardly opening pockets, outer guide means disposed generally radially outwardly of said carriers and cooperable with said carriers to retain cans and like tubular members within said pockets, and each carrier including a movable stripper member for engaging a can or like tubular member at one end thereof to move the same axially with said carrier, an axial guide stationary relative to said movable stripper members opposing said movable stripper members to retain cans and other tubular members in said carriers in an axial direction.

6. The apparatus of claim 5 wherein said reciprocation of said carriers is effected by a fixed cam member, and said fixed axial guide is carrid by said cam member.

7. An apparatus for unloading cans and like tubular members from travelling supports carried by an endless conveyor, said apparatus comprising a turret mounted for rotation about an axis, a plurality of carriers having means defining pockets, means mounting said carriers in uniformly circumferentially spaced relation about said axis for rotation in unison about said axis and independent reciprocation parallel to said axis, the spacing of said carriers corresponding to the spacing of travelling supports from which cans and like tubular members are to be unloaded, means for rotating said turret with said carriers moving at the same rate as the supports, said carriers defining radially outwardly opening pockets, outer guide means disposed generally radially outwardly of said carriers and cooperable with said carriers to retain cans and like tubular members within said pockets, and each carrier including a stripper member for engaging a can or like tubular member at one end thereof to move the same axially with said carrier, and a cam member opposing the path of movement of the travelling supports for pushing cans and like tubular members axially onto said travelling supports in advance of engagement of the cans and like tubular members by carriers to generally axially center the cans and like tubular members with said carriers.

8. An apparatus for unloading cans and like tubular members from travelling supports carried by an endless conveyor, said apparatus comprising a turret mounted for rotation about an axis, a plurality of carriers having means defining pockets, means mounting said carriers in uniformly circumferentially spaced relation about said axis for rotation in unison about said axis and independent reciprocation parallel to said axis, the spacing of said carriers corresponding to the spacing of travelling supports from which cans and like tubular members are to be unloaded, means for rotating said turret with said carriers moving at the same rate as the supports, said carriers defining radially outwardly opening pockets, outer guide means disposed generally radially outwardly of said carriers and cooperable with said carriers to retain cans and like tubular members within said pockets, and each carrier including a stripper member for engaging a can or like tubular member at one end thereof to move the same axially with said carrier, and axis cooperating converging cam means for radially centering cans and like tubular members carried by the travelling supports in advance of engagement of the cans and like tubular members by said carriers to generally radially center the cans and like tubular members relative to said carriers.

9. The apparatus of claim 8 together with adjustable mounting means for adjustably positioning said converging cam means for cooperation with cans and like tubular members of selected diameters.

10. The apparatus of claim 2 together with cooperating converging cam means for radially centering cans and like tubular members carried by the travelling supports in advance of engagement of the cans and like tubular members by said carriers to generally radially center the cans and like tubular members relative to said carriers, and adjustable mounting means for adjustably positioning said converging cam means for cooperation with cans and like tubular members of selected diameters.

11. The apparatus of claim 10 wherein said adjustable mounting means includes means for adjusting at least a portion of said converging cam means in a direction towards an associated one of said doors to compensate for the movement of said one door resulting from the adjustment thereof.

12. An apparatus for unloading cans and like tubular members from travelling supports carried by an endless conveyor, said apparatus comprising a turret mounted for rotation about an axis, a plurality of carriers having means defining pockets, means mounting said carriers in uniformly circumferentially spaced relation about said axis for rotation in unison about said axis and independent reciprocation parallel to said axis, the spacing of said carriers corresponding to the spacing of travelling supports from which cans and like tubular members are to be unloaded, means for rotating said turret with said carriers moving at the same rate as the supports, said carriers defining radially outwardly opening pockets, outer guide means disposed generally radially outwardly of said carriers and cooperable with said carriers to retain cans and like tubular members within said pockets, and each carrier including a stripper member for engaging a can or like tubular member at one end thereof to move the same axially with said carrier, and each carrier including a body having thereon at axially spaced positions mounting means, a plurality of shoes defining said pocket, and said mounting means releaseably and interchangeably mounting said shoes and said stripper member.

13. A method of adjusting an apparatus for handling cans and like tubular members of selected diameters wherein the apparatus is of the type including a plurality of carriers mounted for movement along a predetermined path and wherein there is a guide adjacent said carrier path cooperable with the carriers to retain cans and like tubular members therein, said method comprising the steps of providing a spacer member having first portions corresponding to an intended can body and like tubular member diameter and a second portion of a larger diameter, positioning the spacer member in one of said carriers with first portions thereof being seated in said one carrier, radially adjusting a first portion of said guide into engagement with said spacer member, moving said carriers along said path and radially adjusting said at least another portion of said guide into engagement with said spacer member.

* * * * *